(12) United States Patent
Cordes

(10) Patent No.: US 6,601,445 B2
(45) Date of Patent: Aug. 5, 2003

(54) ROLLER TYPE TEST STAND FOR TESTING MOTOR VEHICLES AND/OR TIRES

(75) Inventor: Jörg Cordes, Plainfield, IN (US)

(73) Assignee: RENK Aktiengesellschaft, Augsburg (DE)

(*) Notice: Subject to any disclaimer, the term of this patent is extended or adjusted under 35 U.S.C. 154(b) by 0 days.

(21) Appl. No.: 09/739,984

(22) Filed: Dec. 19, 2000

(65) Prior Publication Data

US 2002/0043102 A1 Apr. 18, 2002

(30) Foreign Application Priority Data

Oct. 13, 2000 (DE) .......................... 100 50 789

(51) Int. Cl.[7] .............................................. G01M 15/00
(52) U.S. Cl. ........................................................ 73/123
(58) Field of Search .......................... 73/117, 123, 126, 73/669, 670

(56) References Cited

U.S. PATENT DOCUMENTS 5,154,077 A * 10/1992 Fujimori ....................... 73/117
5,450,748 A * 9/1995 Evans et al. ................... 73/117

FOREIGN PATENT DOCUMENTS

DE 199 00 620 A1 7/2000 .......... G01M/17/00

* cited by examiner

Primary Examiner—Eric S. McCall
Assistant Examiner—Monica D. Harrison
(74) Attorney, Agent, or Firm—Cohen, Pontani, Lieberman & Pavane

(57) ABSTRACT

A roller type test stand for motor vehicles and/or wheel/tire combinations including at least one running roller for supporting the wheels, a supporting frame and a drive arranged between the running rollers. The drive is a motor/transmission combination including a shaft for supporting the running rollers, a transmission and at least one motor. The motor is arranged next to the shaft and is connected to the shaft via a transmission. The motor/transmission combination is arranged on a frame that is swing mounted on the supporting frame. At least one measuring apparatus is arranged on the frame between the running rollers. Alternatively, the frame may be replaced by a housing.

21 Claims, 6 Drawing Sheets

ROLLER TYPE TEST STAND FOR TESTING MOTOR VEHICLES AND/OR TIRES

BACKGROUND OF THE INVENTION

1. Field of the Invention

The present invention relates to a roller type test stand for motor vehicles and/or wheel/tire combinations. More particularly, the present inventions relations to a roller type test stand where bearings, lubrication devices and measuring equipment are prevented from introducing error into the test results.

2. Description of the Related Art

In testing vehicle dynamics parameters and exhaust emissions of motor vehicles driven by internal combustion engines, roller or drum type test stands are used that allow various driving conditions to be simulated. For example, in performing tests on braking functions, exhaust emissions, or the like, the vehicle to be tested is fixed in the correct position in the roller type test stand. Either both wheels of one axle or both wheels of several axles standing on the vertex region of respective pairs of running rollers, depending on the design of the test stand. The pairs of running rollers are coupled to driving and deceleration machines that are connected to measuring elements and measuring apparatuses for detecting the torques or tensile forces that occur under various test conditions.

German reference DE 199 00 620 A1 discloses a roller type test stand for motor vehicles in which both running rollers are driven directly in synchrony via a common shaft using an electric motor arranged centrally between the running rollers. The stator housing of this motor is swing mounted in a supporting frame and is supported on the supporting frame by a measuring apparatus designed as a dynamometer.

The stator housing and the motor rotor mounted on the housing designed as the aforementioned shaft are swing mounted on the supporting frame by means of leaf-spring elements or sliding bearings. The leaf spring elements present a small resistance to the twisting movement of the stator housing. The shaft is mounted in the swing mounting by means of sliding bearings.

The bearing shells of these sliding bearings are constructed with pocket or groove like depressions to avoid premature wear of the sliding bearings of the shaft and of the sliding bearings of the swing mounting. The sliding bearings are supplied with a constant volume flow of pressurized oil.

SUMMARY OF THE INVENTION

The object of the present invention is to provide a roller type test stand that give more accurate measurements with a reduced outlay in terms of construction.

According to the invention, the object is achieved by a set of running rollers driven by a motor/transmission combination that is grouped together as a unit in a swing mounted frame arranged between the running rollers. The frame serves to absorb all the high or excessive forces that occur during operation. A shaft for supporting the running rollers is mounted on the frame within the swing mounting so as to avoid bearing losses. At least one measuring apparatus, by means of which all the forces that occur can be determined, is arranged on the swing mounted frame.

The roller type test stand configured in accord with the present invention provides for an even more accurate measurement, which takes into account all the forces and losses, e.g., frictional losses, that occur during a measurement. The invention has the advantage that there are no bearings subject to loads due to rotational speed arranged outside the swing mounting. As a result, no forces or losses, e.g., frictional losses, that are not recorded by the measuring apparatus occur. In other words, all of the forces or losses intended for recordation are measured.

In an embodiment of the present invention one or more drive motors are used in the motor/transmission combination. The use of a plurality of drive motors makes it possible to employ motors with a lower torque and thus also smaller dimensions, thereby making it possible to achieve a compact motor/transmission combination.

In a preferred embodiment of the present invention, the transmission is configured as a gear set which comprises, for example, spur toothed gearwheels or cylindrical gearwheels and is flanged directly to the drive motors. Alternatively, the transmission can also be configured as a belt or chain drive.

Further advantages are apparent in the choice of lubricant to be used for this roller type test stand. It is possible to dispense with expensive pressurized oil lubrication. Lubricant is supplied to the transmission and the bearings, for example, by means of a splash lubrication system integrated into the frame carrying the motor/transmission combination. The temperature of the lubricant can be controlled by means of air/oil coolers integrated into the frame of the motor/transmission combination. A lubrication device of this kind integrated into the drive or motor/transmission combination has the particular advantage that external disturbances that can falsify the measurement are avoided. Such disturbances can be caused, for example, by a lubricant supply device arranged outside the roller type test stand and connected via supply lines to the drive and the bearings.

In a further embodiment of the present invention, the frame is constructed with housing type elements and receiving means for accommodating assemblies such as the above-mentioned air/oil cooler or the drive motors.

In a still further embodiment of the present invention, the motor/transmission combination can be made switchable and/or exchangable in order to adapt the accuracy of monitoring and measurement to various categories of vehicles to be tested. Switching can be achieved, for example, by the use of a shiftable transmission and/or by turning individual drive motors on and off.

To cool the motor/transmission combination, one or more fans are arranged separate from the swing mounted motor/transmission combination for supplying the motor/transmission combination with cooling air in a contactless manner using cooling air supply nozzles or ducts. This arrangement has the advantage of avoiding the introduction of disturbances that would falsify the measurement because assemblies such as fans, that can cause a possible disturbance or possible measurement error, are outside the test stand components for measurement and are arranged without a direct connection to the test stand components for measurement, e.g., by means of hoses or cables.

In an alternative embodiment, the motor/transmission combination can be mounted on a housing swing mounted on the supporting frame, rather than the frame. It is also possible for this housing to be directly associated with only one component of the motor/transmission combination e.g, a transmission housing or a motor housing. All other components belonging to the motor/transmission combination may likewise be mounted on this housing, with the housing being swing mounted on the supporting frame.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views, the present invention is shown in schematic form, as follows.

DETAILED DESCRIPTION OF THE PRESENTLY PREFERRED EMBODIMENTS

Figure 1:
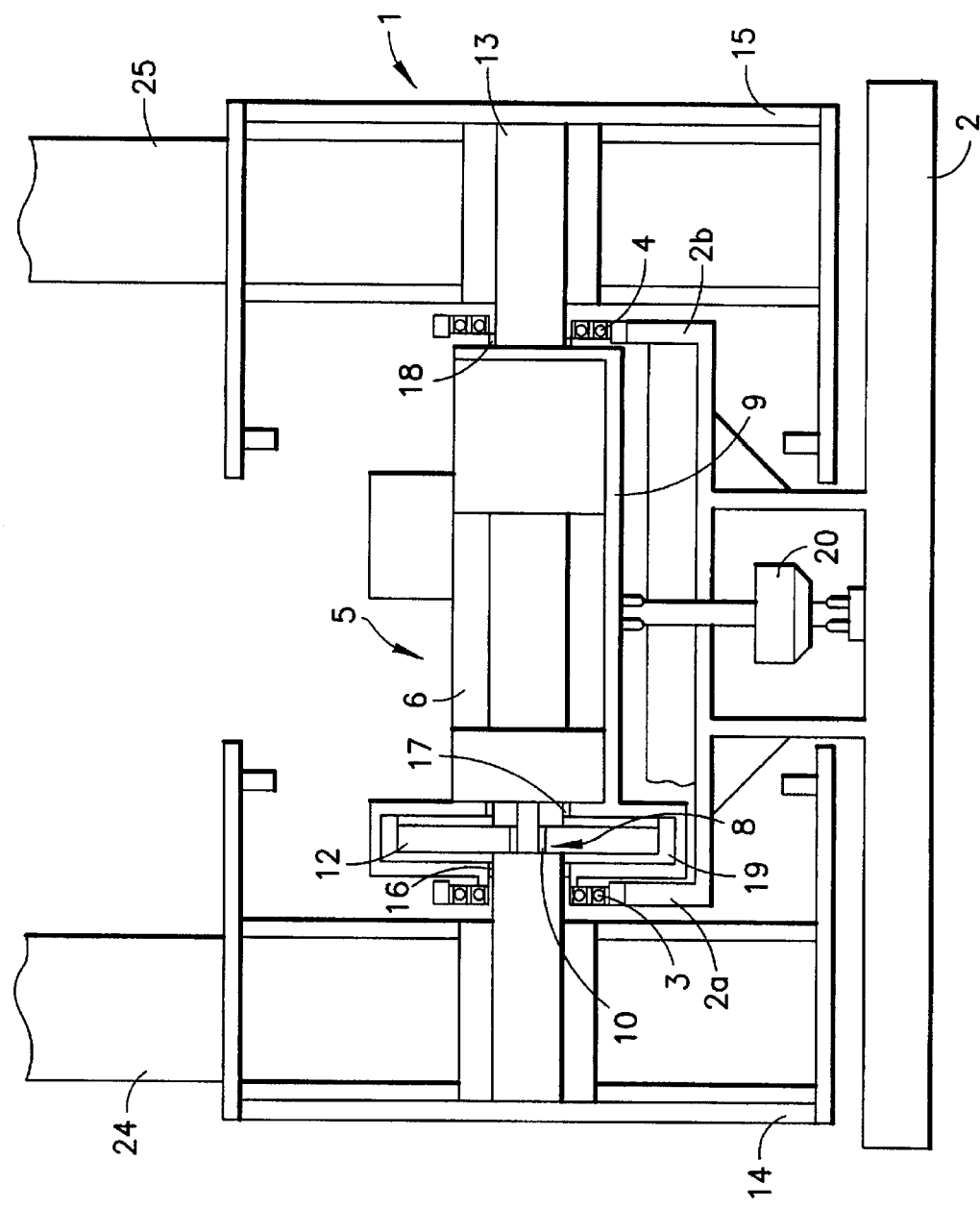
FIG. 1 is a side view of a roller type test stand according to the present invention.

Referring now to FIG. 1 a side view of a roller type test stand 1 according to the present invention is shown. The roller type test stand 1 comprises a supporting frame 2 and supporting arms 2a, 2b arranged thereon. A motor/transmission combination 5 is mounted in a pivotable frame 9 which is pivotably mounted between the supporting arms 2a, 2b by bearing elements 3, 4.

Figure 2:
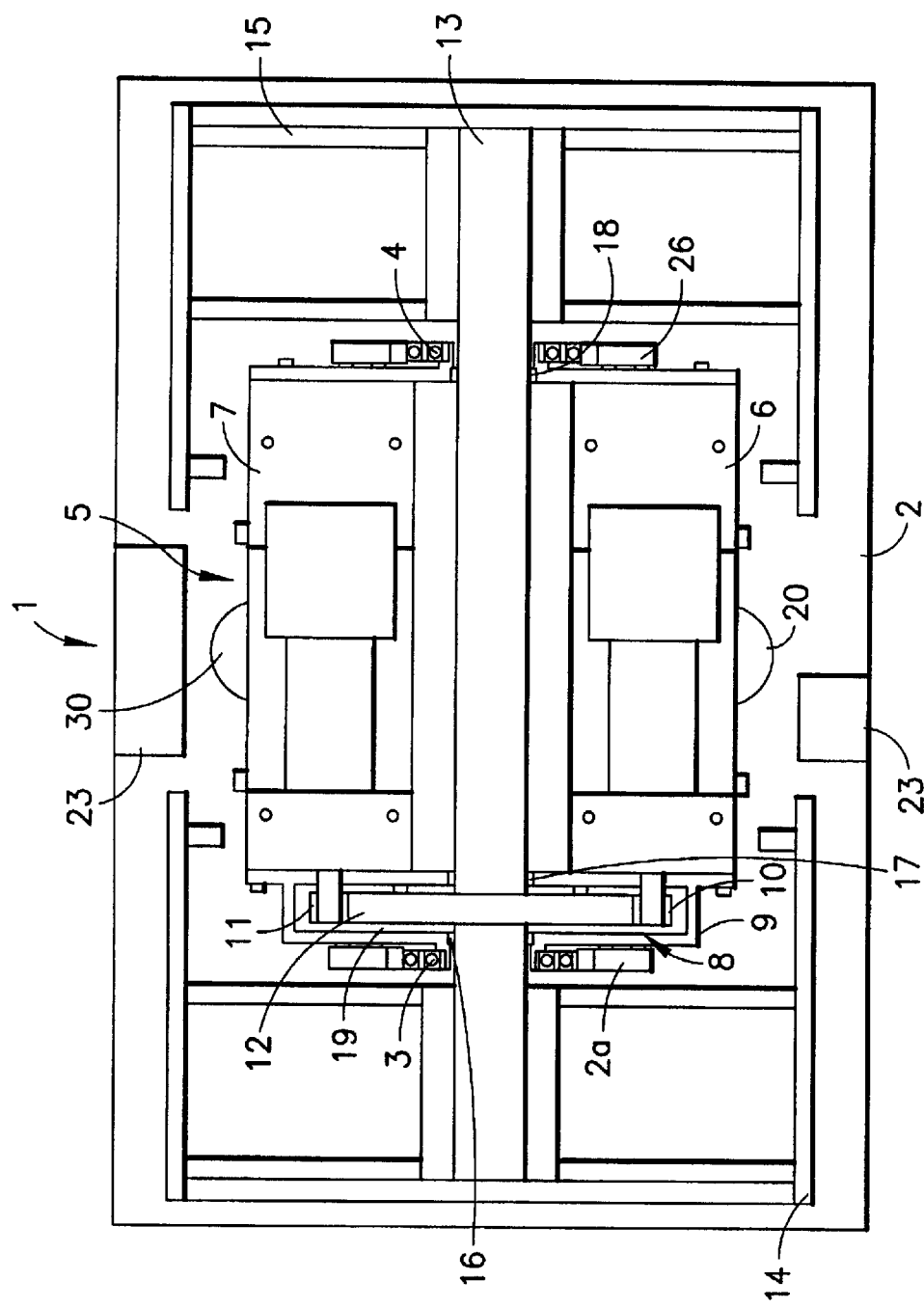
FIG. 2 is a plan view of the roller type test stand shown in FIG. 1.
Figure 3:
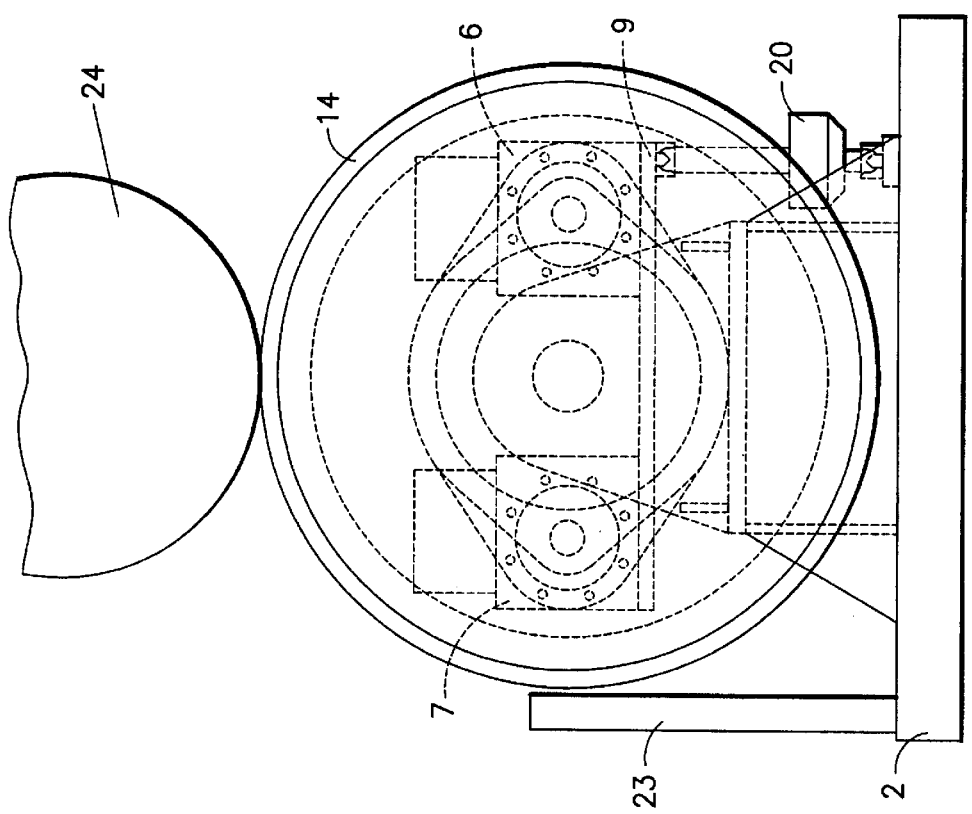
FIG. 3 is another side view of the present invention in accord with FIG. 1.

Referring now to FIG. 2, a plan view of the present invention is shown. The motor/transmission combination 5 comprises a first motor 6, a further motor 7, a transmission 8 and the pivotable frame 9. An electric motor and/or a hydraulic motor is provided as the motor 6, 7.

The transmission 8 comprises two pinions 10, 11, which are arranged directly on the motors 6, 7, and a gearwheel 12, which meshes with the pinions 10, 11. The gearwheel 12 is arranged on a shaft 13. Running rollers 14, 15 are arranged at both ends of the shaft 13.

The shaft 13 is mounted on the frame 9 by means of bearing elements 16, 17, 18. The motors 6, 7 are also mounted on the frame 9. The frame 9 can be in the form of a housing or a trough shaped configuration in the region of the transmission 8. This allows a lubrication device 19 in the form of a splash lubrication system to be integrated. As an alternative, housing type elements can be arranged on the frame 9 in a manner not specifically shown.

The frame 9 and its housing type configuration elements are penetrated by openings and duct elements to enable cooling air fed in from the outside by means of cooling-air generators 23, (e.g., fans or compressors), to be passed to the assemblies to be cooled, such as the motors 6, 7 and transmissions 8 together with the lubrication device 19.

A measuring apparatus 20, e.g., a load cell, is arranged between the frame 9 and the supporting frame 2. In addition, a further measuring apparatus 30 can be arranged between the frame 9 and the supporting frame 2. Preferably, the further measuring apparatus 30 is arranged opposite the measuring apparatus 20.

A motor vehicle arranged for testing on the running rollers 14, 15 of the test stand 1 either drives or is driven by the test stand 1 by means of its motor/transmission combination 5. The motor vehicle is supported on the running rollers 14, 15 by means of its driven wheels 24, 25. In both cases, the forces and/or torques that arise are transmitted via the motor/transmission combination 5 and, in particular, via the swing mounted frame 9 to the measuring apparatus 20 connected to the frame 9. If, when checking exhaust emissions from the motor vehicle, for example, the torque transmitted from the driven wheels 24, 25 of the motor vehicle to the running rollers 14, 15 is introduced into the motor/transmission combination 5, then the swing mounted frame 9 carrying the motor/transmission combination 5 responds by turning or pivoting within the limits determined by the measuring apparatus 20, 30. The reaction torque of the frame 9 is detected by the measuring apparatus 20, 30, e.g., a torque or force sensor (not specifically shown). Changes in the torque exerted by the frame 9 are thus detected as measured values by the measuring apparatus 20, 30.

As an alternative to the transmission 8 used, it is also possible to use a belt drive or chain drive (not specifically shown). It is also possible to configure the gearwheel 12 as a ring gear.

Another embodiment (not specifically shown) of the test stand of the present invention includes a suitable motor/transmission combination 5 to enable the accuracy of monitoring and measurement to be adapted to different categories of vehicle to be tested. As a result, for example, anything from a motorcycle to a truck may be tested using a single test stand. This switchability can be achieved, for example, by using a shiftable transmission 8 and/or by switching the individual motors 6, 7 on and off.

Figure 4:
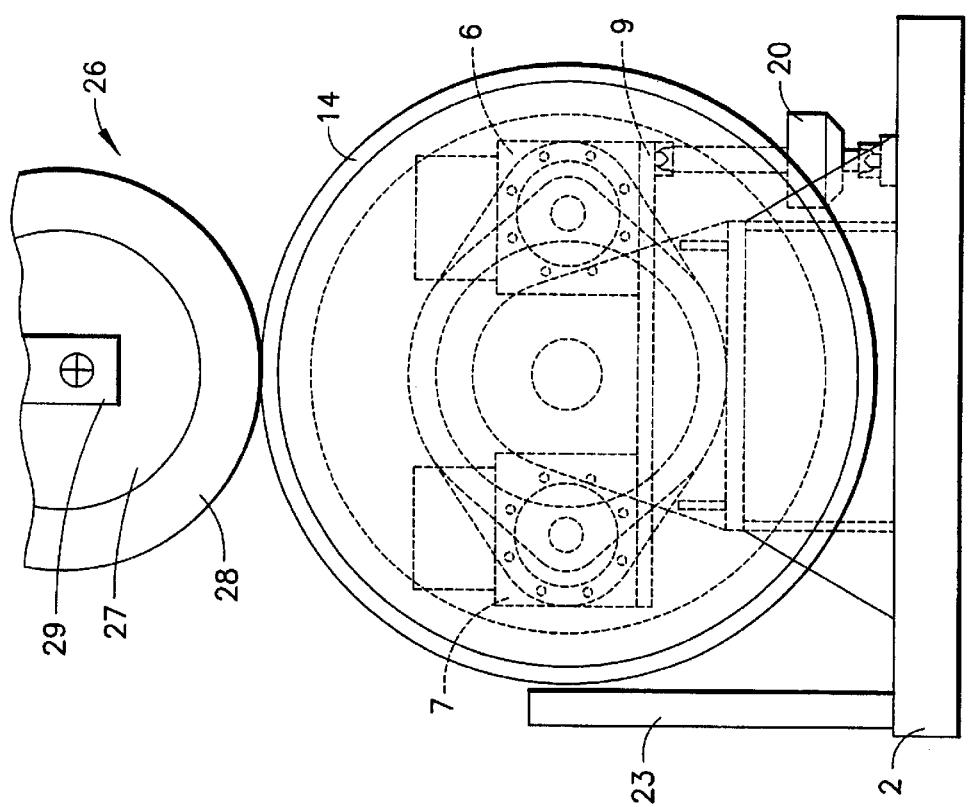
FIG. 4 shows a roller type test stand in accord with FIG. 3 with a wheel/tire combination arranged thereon.

Referring now to FIG. 4, use of the test stand described is not intended to be limited only to use for checking motor vehicles. The test stand is also suitable for checking wheel/tire combinations 26 comprising a rim 27 and a tire 28 on a test frame 29.

Figure 5:
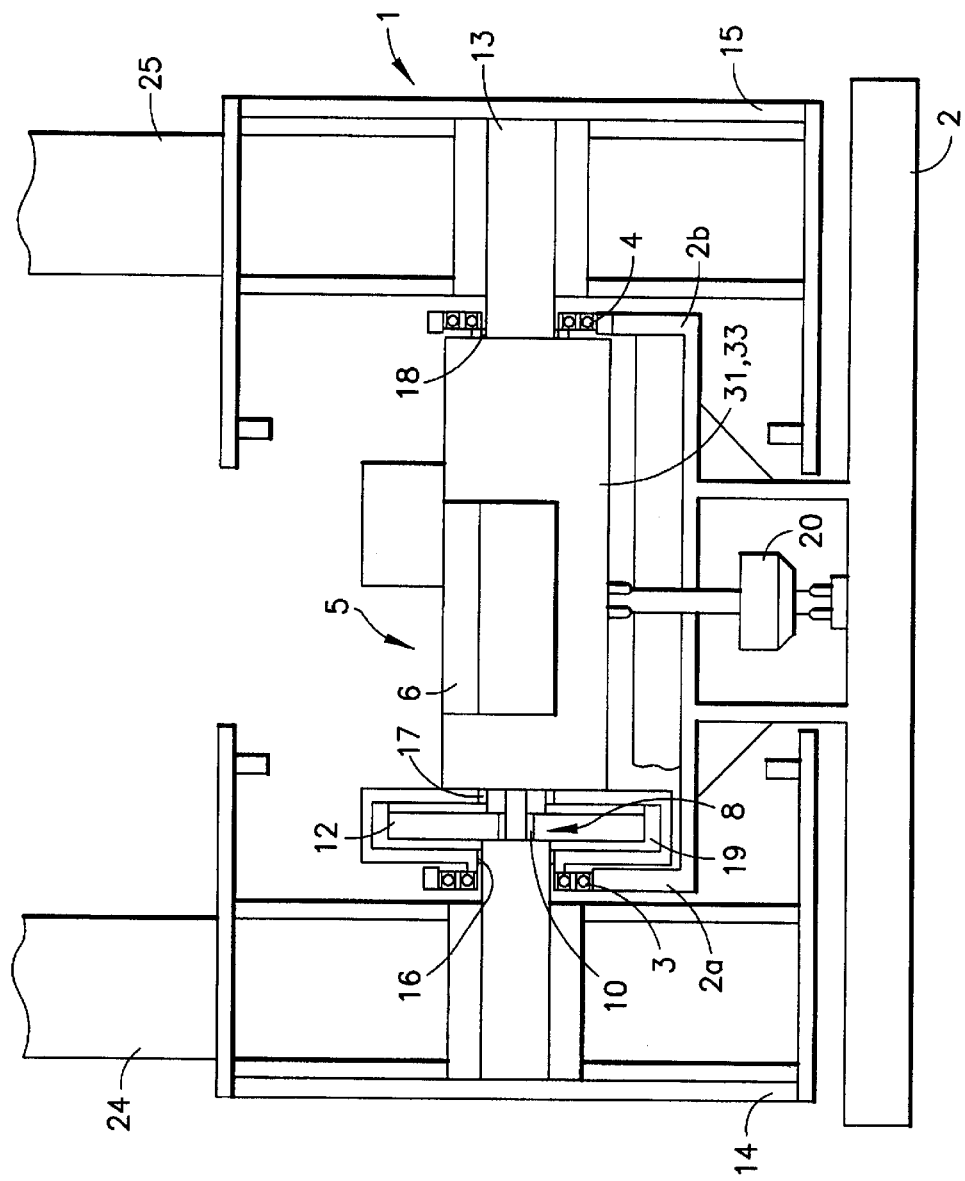
FIG. 5 shows a roller type test stand in accord with FIG. 1 with a swing mounted motor housing.
Figure 6:
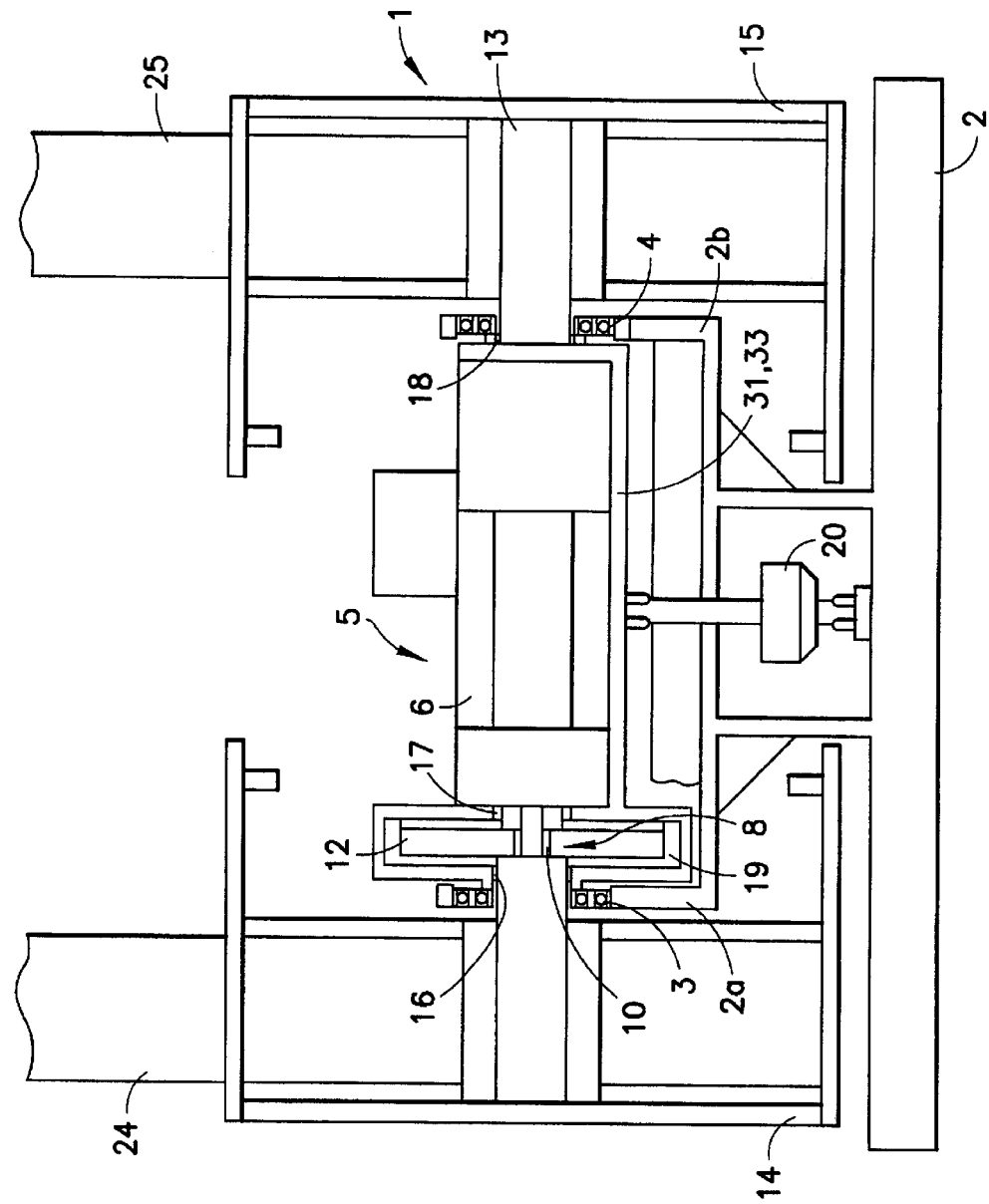
FIG. 6 shows a roller type test stand in accord with FIG. 1 with a swing mounted transmission housing.

Referring now to FIGS. 5 and 6, a further embodiment of the present invention is shown. The frame 9 (shown in FIGS. 1–4) carrying the motor/transmission combination 5 is replaced with a housing 31 which is swing mounted on the supporting frame 2. The motor/transmission combination 5 is mounted on the housing 31.

It is also possible for this housing to be associated directly only with one component of the motor/transmission combination, namely one constituent part of a component, such as a transmission housing 33 or a motor housing 32. All the other components and elements belonging to the motor/transmission combination 5 may be mounted on this motor housing 32 or transmission housing 33 and this being swing mounted on the supporting frame 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A test stand for one of a motor vehicle having wheels and a wheel/tire combination, comprising:
    a pair of running rollers for supporting respective wheels;
    a supporting frame;
    a pivotable frame pivotably mounted on the supporting frame;
    at least one measuring apparatus interposed between the pivotable frame and the supporting frame; and
    a drive arranged on the pivotable frame between the running rollers, the drive comprising a shaft supporting the running rollers, at least one motor arranged beside the shaft, and a transmission, wherein the at least one motor is connected to the shaft by the transmission.

2. A test stand for one of a motor vehicle having wheels and a wheel/tire combination, comprising:
    a pair of running rollers for supporting respective wheels;
    a supporting frame;
    a housing pivotably mounted on the supporting frame;
    at least one measuring apparatus interposed between the housing and the supporting frame; and
    a drive arranged on the housing between the running rollers, the drive comprising a shaft supporting the running rollers, at least one motor arranged beside the shaft, and a transmission, wherein the at least one motor is connected to the shaft by the transmission.

3. The test stand according to claim 2, the housing being a motor housing, wherein the drive is arranged on the motor housing.

4. The test stand according to claim 2, the housing being a transmission housing, wherein the drive is arranged on the transmission housing.

5. The test stand according to claim 1, wherein the shaft is mounted drive.

6. The test stand according to claim 2, wherein the shaft is mounted drive.

7. The test stand according to claim 1, wherein the shaft is mounted on the pivotable frame.

8. The test stand according to claim 1, further comprising:
    at least one cooling air generator arranged so as to cool the drive, wherein the cooling air generator is decoupled from the drive.

9. The test stand according to claim 2, further comprising:
    at least one cooling air generator arranged so as to cool the drive, wherein the cooling air generator is decoupled from the drive.

10. The test stand according to claim 1, further comprising:
    at least one cooling air generator arranged on the supporting frame for cooling at least one of the motor and the transmission, wherein the cooling air generator is decoupled from the pivotable frame.

11. The test stand according to claim 2, further comprising:
    at least one cooling air generator arranged on the supporting frame for cooling at least one of the motor and the transmission, wherein the cooling air generator is decoupled from the housing.

12. The test stand according to claim 1, further comprising:
    a plurality of bearing elements interposed between the shaft and the pivtoable frame for mounting the shaft on the pivotable frame; and
    an internal lubrication device for supplying the transmission and the bearing elements with a lubricant.

13. The test stand according to claim 2, further comprising:
    a plurality of bearing elements interposed between the shaft and the housing for mounting the shaft on the housing; and
    an internal lubrication device arranged in the frame for supplying the transmission and the bearing elements with a lubricant.

14. The test stand according to claim 12, wherein the lubrication device is a splash lubrication system.

15. The test stand according to claim 13, wherein the lubrication device is a splash lubrication system.

16. The test stand according to claim 1, wherein the motor is a hydraulic motor.

17. The test stand according to claim 2, wherein the motor is a hydraulic motor.

18. The test stand according to claim 1 wherein the shaft is mounted coaxially between the rollers.

19. The test stand according to claim 2 wherein the shaft is mounted coaxially between the rollers.

20. The test stand according to claim 1 wherein the combination comprises two said motors connected to the shaft by the transmission, the shaft being situated between the two motors.

21. The test stand according to claim 2 wherein the combination comprises two said motors connected to the shaft by the transmission, the shaft being situated between the two motors.

* * * * *